United States Patent
Kohara

(10) Patent No.: US 12,322,291 B2
(45) Date of Patent: Jun. 3, 2025

(54) PARKING ASSIST APPARATUS, PARKING ASSIST SYSTEM, AND PARKING ASSIST METHOD

(71) Applicant: DENSO CORPORATION, Kariya (JP)

(72) Inventor: Kenji Kohara, Kariya (JP)

(73) Assignee: DENSO CORPORATION, Kariya (JP)

( * ) Notice: Subject to any disclaimer, the term of this patent is extended or adjusted under 35 U.S.C. 154(b) by 210 days.

(21) Appl. No.: 17/935,887

(22) Filed: Sep. 27, 2022

(65) Prior Publication Data

US 2023/0017805 A1 Jan. 19, 2023

Related U.S. Application Data

(63) Continuation of application No. PCT/JP2021/004243, filed on Feb. 5, 2021.

(30) Foreign Application Priority Data

Apr. 2, 2020 (JP) .................................. 2020-066822

(51) Int. Cl.
G08G 1/14 (2006.01)
B60W 30/06 (2006.01)
(Continued)

(52) U.S. Cl.
CPC ............ *G08G 1/143* (2013.01); *B60W 30/06* (2013.01); *G08G 1/096725* (2013.01); *G08G 1/096827* (2013.01)

(58) Field of Classification Search
CPC ............ B62D 15/0275; B62D 15/0285; G08G 1/143; G08G 1/096725; G08G 1/096827; G08G 1/168; B60W 30/06
See application file for complete search history.

(56) References Cited

U.S. PATENT DOCUMENTS

2005/0231341 A1* 10/2005 Shimizu ................. G08G 1/165
340/901
2015/0307024 A1* 10/2015 Fukuda .................. B60Q 9/008
382/103

(Continued)

FOREIGN PATENT DOCUMENTS

JP H06-018664 A 1/1994
JP 2014-036326 A 2/2014

(Continued)

*Primary Examiner* — Joan T Goodbody
*Assistant Examiner* — Godfrey Aleksander Maciorowski
(74) *Attorney, Agent, or Firm* — Maschoff Brennan

(57) ABSTRACT

A parking assist apparatus is configured to: detect a level difference existing around the vehicle; determine whether the detected level difference is a passing target level difference required to be passed without avoidance or an avoidance target level difference required to be avoided; and control a notification apparatus to output, toward an inside of a compartment of the vehicle, a notification indicating a passing plan of the passing target level difference in response to the detected level difference, which exists on a traveling route to be traveled by the vehicle within a parking area for parking purpose, being determined as the passing target level difference. The notification apparatus is controlled to output the notification indicating the passing plan of the passing target level difference in a notification mode that distinguishes the passing target level difference from the avoidance target level difference.

12 Claims, 7 Drawing Sheets

(51) Int. Cl.
   *G08G 1/0967*   (2006.01)
   *G08G 1/0968*   (2006.01)

(56) References Cited

U.S. PATENT DOCUMENTS

2018/0093662 A1* 4/2018 Kim .................... G05D 1/0231
2018/0170366 A1* 6/2018 Fukushima ........ B62D 15/0285
2019/0082123 A1  3/2019 Yamada

FOREIGN PATENT DOCUMENTS

| JP | 2016-173644 A |   | 9/2016 |
| --- | --- | --- | --- |
| JP | 2016173644 | * | 9/2016 |
| JP | 2018-090108 A |   | 6/2018 |
| JP | 2018090108 | * | 6/2018 |
| JP | 2018-118593 A |   | 8/2018 |

* cited by examiner

PARKING ASSIST APPARATUS, PARKING ASSIST SYSTEM, AND PARKING ASSIST METHOD

CROSS REFERENCE TO RELATED APPLICATIONS

The present application is a continuation application of International Patent Application No. PCT/JP2021/004243 filed on Feb. 5, 2021, which designated the U.S. and claims the benefit of priority from Japanese Patent Application No. 2020-066822 filed on Apr. 2, 2020. The entire disclosures of all of the above applications are incorporated herein by reference.

TECHNICAL FIELD

The present disclosure relates to a parking assist apparatus, a parking assist system, and a parking assist method.

BACKGROUND

Conventionally, a technique of providing a parking route using an automatic parking system is known.

SUMMARY

The present disclosure provides a parking assist apparatus, which assists a parking of a vehicle. The parking assist apparatus is configured to: detect a level difference existing around the vehicle; determine whether the detected level difference is a passing target level difference required to be passed without avoidance or an avoidance target level difference required to be avoided; and control a notification apparatus to output, toward an inside of a compartment of the vehicle, a notification indicating a passing plan of the passing target level difference in response to the detected level difference, which exists on a traveling route to be traveled by the vehicle within a parking area for parking purpose, being determined as the passing target level difference. The notification apparatus is controlled to output the notification indicating the passing plan of the passing target level difference in a notification mode that distinguishes the passing target level difference from the avoidance target level difference.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
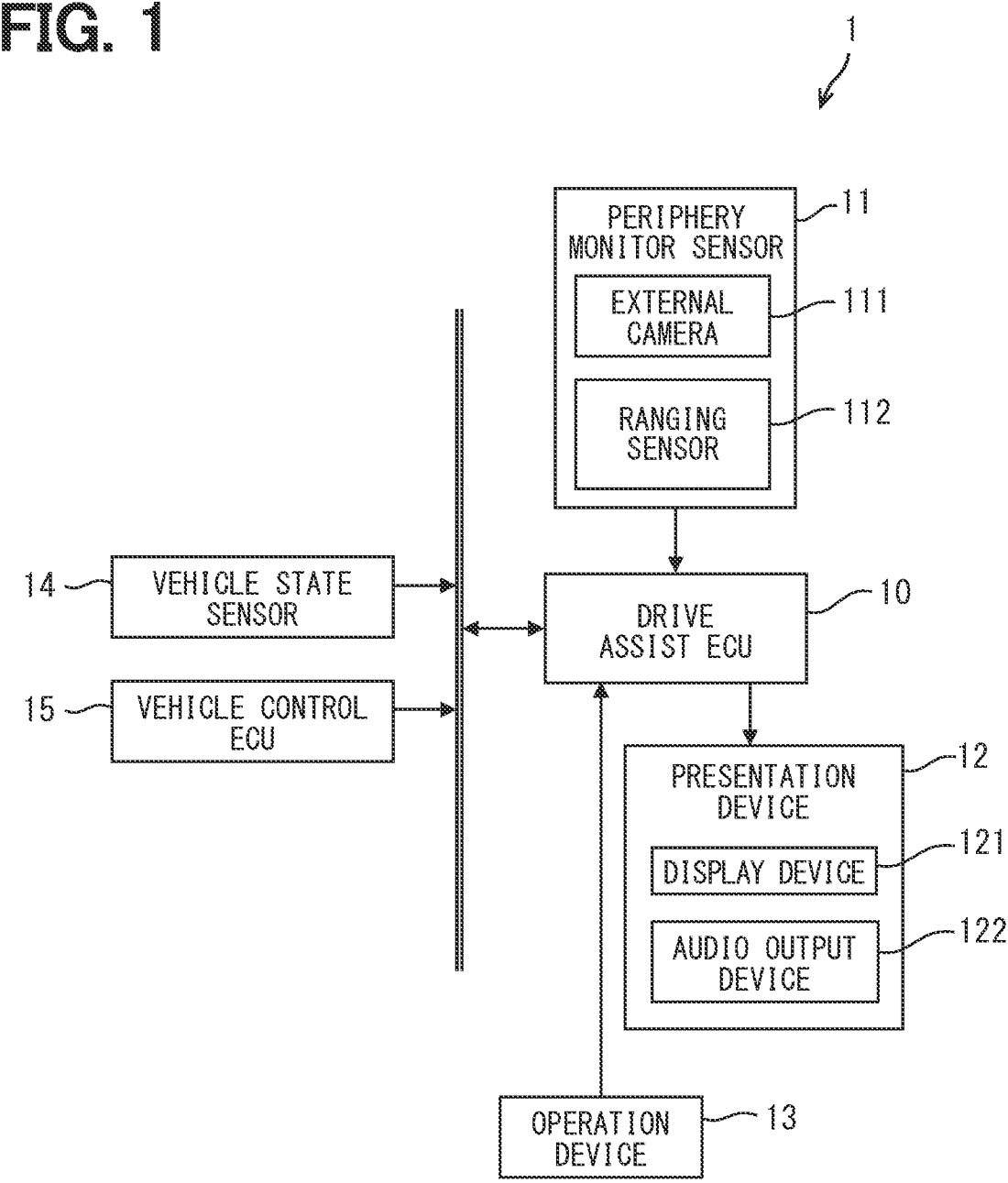
FIG. 1 is a diagram showing an example of a schematic configuration of a driving assist system.

Before describing embodiments of the present disclosure, a known art will be described first. There has been known a technique of providing a parking route using an automatic parking system that assists a vehicle to perform an automatic parking by automated driving. The automatic parking route is generated by avoiding a level difference of an obstacle having a height equal to or greater than a predetermined threshold. The height of level difference may be detected by a laser sensor. When the parking route cannot be generated due to a presence of the obstacle having a height equal to or greater than the predetermined threshold, a device may be configured to notify the failure in generating of the parking route. The device determines that the vehicle can pass the obstacle having a height less than the predetermined threshold, and generates acceleration magnitude and brake pressure magnitude corresponding to an angle between a height direction and a slope of the obstacle having the level difference.

In the above known art, when the obstacle existing in the parking route has a height less than the predetermined threshold, the vehicle is controlled to pass the obstacle. In this configuration, it is assumed that an occupant is notified of the failure in generating of parking route. However, when the parking route can be set, the known art does not disclose or teach outputting, to the occupant, a notification indicating that the parking route requires the vehicle to pass the obstacle. When the vehicle passes the level difference included in the obstacle, the occupant may be subject to a shock caused by passing of the level difference.

According to an aspect of the present disclosure, a parking assist apparatus, which assists a parking of a vehicle, includes: a level difference detection unit detecting a level difference existing around the vehicle; a level difference determination unit determining whether the level difference detected by the level difference detection unit is a passing target level difference required to be passed without avoidance or an avoidance target level difference required to be avoided; and a notification processing unit controlling a notification apparatus to output, toward an inside of a compartment of the vehicle, a notification indicating a passing plan of the passing target level difference in response to the level difference determination unit determining that the level difference existing on a traveling route to be traveled by the vehicle within a parking area for parking purpose is the passing target level difference. The notification processing unit controls the notification apparatus to output the notification indicating the passing plan of the passing target level difference in a notification mode that distinguishes the passing target level difference from the avoidance target level difference.

According to another aspect of the present disclosure, a parking assist method, which assists a parking of a vehicle and being executed by at least one processor, includes: detecting a level difference existing around the vehicle; determining whether the detected level difference is a passing target level difference required to be passed without avoidance or an avoidance target level difference required to be avoided; and controlling a notification apparatus to output, toward an inside of a compartment of the vehicle, a notification indicating a passing plan of the passing target level difference in response to the detected level difference, which exists on a traveling route to be traveled by the vehicle within a parking area for parking purpose, being determined as the passing target level difference. The notification apparatus is controlled to output the notification indicating the passing plan of the passing target level difference in a notification mode that distinguishes the passing target level difference from the avoidance target level difference.

In the above parking assist apparatus and parking assist method, the notification apparatus is controlled to output, toward the inside of the compartment of the vehicle, the notification indicating the passing plan of the passing target level difference in response to the detected level difference, which exists on the traveling route to be traveled by the vehicle within the parking area for parking purpose, being determined as the passing target level difference that is required to be passed over without avoidance. When a level difference determined as the passing target level difference exists on the traveling route to be traveled by the vehicle within the parking area for parking purpose, the vehicle is planned to pass over the level difference during the parking. With this configuration, when the vehicle is planned to pass over the level difference during the parking, the occupant of the vehicle is notified that the vehicle is going to pass over the level difference. Thus, it is possible to notify the passing of level difference to the occupant of the vehicle in advance.

According to another aspect of the present disclosure, a parking assist system includes a notification apparatus, which is mounted to the vehicle and outputs the notification toward the inside of the compartment of the vehicle, in addition to the parking assist apparatus described above.

The parking assist system includes the above-described parking assist apparatus. Thus, when the vehicle is planned to pass over the level difference during the parking, it is possible to notify the passing of level difference to the occupant of the vehicle in advance.

The following will describe embodiments of the present disclosure with reference to the accompanying drawings. For convenience of description, among multiple embodiments, a configuration having the same function as a configuration shown in the drawing and described in the previous embodiment may be indicated by the same reference symbol, and the description thereof may be omitted. For the configuration having the same reference symbol as in the previous embodiment, detailed description may be omitted in other embodiments.

First Embodiment (Configuration of Driving Assist System 1)

The following will describe a first embodiment of the present disclosure with reference to the accompanying drawings. A driving assist system 1 shown in FIG. 1 is used in a vehicle, and includes a driving assist ECU 10, a periphery monitoring sensor 11, a presentation device 12, an operation device 13, a vehicle state sensor 14, and a vehicle control ECU 15. For example, the driving assist ECU 10, the vehicle state sensor 14, and the vehicle control ECU 15 may be connected to an in-vehicle LAN. The driving assist system 1 corresponds to a parking assist system of the present disclosure. Hereinafter, a vehicle using the driving assist system 1 is referred to as an own vehicle.

The periphery monitoring sensor 11 monitors a periphery of the own vehicle. The periphery monitoring sensor 11 senses a periphery of the vehicle. The periphery monitoring sensor 11 includes an external camera 111 and a ranging sensor 112.

The external camera 111 is an imaging device that captures images of the periphery of the vehicle. As an example, four external cameras 111 may be equipped to the vehicle, and the four external cameras are arranged to capture images in four directions of the vehicle including a front direction, a rear direction, a left direction, and a right direction. By this arrangement, it is possible to display a synthesized image showing an entire surrounding of the own vehicle by synthesizing images captured by respective external cameras. Hereinafter, the external camera 111 capturing images within a predetermined range along the front direction of the vehicle will be referred to as a front camera. The external camera 111 capturing images within a predetermined range along the right direction of the vehicle will be referred to as a right camera. The external camera 111 capturing images within a predetermined range along the rear direction of the vehicle will be referred to as a rear camera. The external camera 111 capturing images within a predetermined range along the left direction of the vehicle will be referred to as a left camera.

The ranging sensor 112 detects a distance from the own vehicle to a ranging point on an object by transmitting a probe wave and receiving a reflected wave. The reflected wave is generated when the probe wave is reflected on the object. The ranging point is a location on the surface of an object where the probe wave is reflected. For example, as the ranging sensor, a millimeter wave radar, LIDAR (Light Detection and Ranging/Laser Imaging Detection and Ranging), sonar, or the like may be used. The ranging sensor 112 may be configured by combining these multiple types of sensors as one sensor unit. In the following, an example where the ranging sensor 112 is provided by a sensor unit in which the sonar and the LIDAR are combined will be described. In the following description, a sensing range of the sonar includes predetermined ranges on a left lateral side and a right lateral side of the own vehicle. The sensing range of the LIDAR includes predetermined ranges in front of the own vehicle and on a rear side of the own vehicle. The LIDAR may be replaced with a millimeter wave radar.

The presentation device 12 presents information toward an inside of a vehicle compartment. The information presented by the presentation device 12 includes a notification. The presentation device 12 corresponds to a notification apparatus of the present disclosure. The presentation device 12 presents information according to an instruction output from the driving assist ECU 10. The presentation device 12 may be configured to receive an instruction from the driving assist ECU 10 via another ECU that controls the presentation device 12 instead of directly receiving the instruction from the driving assist ECU 10. The presentation device 12 includes a display device 121 and an audio output device 122.

The display device 121 presents information by displaying the information. The display device 121 is disposed in the compartment of the own vehicle. Examples of the display device 121 include a meter multi information display (hereafter referred to as meter MID), a center information display (hereafter referred to as CID), and a display of vehicle navigation device. The meter MID has a display area, which is arranged in front of the driver's seat. As an example, the meter MID may be arranged on the meter panel. As the meter MID, a liquid crystal display, an organic EL display, or the like may be used. The CID has a display area, which is arranged, for example, in a center cluster. As the CID, a liquid crystal display, an organic EL display, or the like may be used. In the present embodiment, the CID is used as the display device 121 as an example.

The audio output device 122 presents information by outputting an audio signal. The audio output device 122 is disposed in the compartment of the own vehicle. The audio output device 122 may be provided by an audio speaker or the like.

The operation device 13 is an intention input unit that receives an operation made by an occupant of the own vehicle. The operation device 13 includes a parking assist switch (hereinafter referred to as parking assist SW) that receives an operation made by the occupant to start the parking assist. The operation device 13 may also include a switch for switching parking assist mode (hereinafter referred to as a function switchover SW).

The parking assist mode may include an automatic parking, a manual parking assist, and no parking assist. The automatic parking is a mode in which a parking assist is performed by automatically driving the own vehicle to a target parking area. The manual parking assist is a mode in which a parking assist is performed by displaying an estimated track of the own vehicle, which changes corresponding to a steering angle of the own vehicle, on a traveling direction image of the own vehicle in superimposed manner. The estimated track referred to here may be estimated moving tracks of the left and right wheels in the traveling direction of the own vehicle, or may be a pair of left and right tracks of the both left and right lateral surfaces of the own vehicle. Alternatively, the estimated track may be a pair of left and right tracks including an outermost periphery track of the own vehicle and an innermost periphery track of the own vehicle. The no parking assist is a mode in which neither the automatic parking nor the manual parking assist is performed.

As described above, the operation device 13 receives an operation made by an occupant of the own vehicle here. However, the present disclosure is not necessarily limited to this configuration. For example, instead of the operation device 13, a voice input device may be configured to receive a voice output from the occupant of the own vehicle to perform the corresponding parking assist.

The vehicle state sensor 14 is a sensor group for detecting a traveling state of the own vehicle. The vehicle state sensor 14 includes a vehicle speed sensor, a steering angle sensor, a shift position sensor, and the like. The vehicle speed sensor detects a speed of the own vehicle. The steering angle sensor detects a steering angle of the own vehicle. The shift position sensor detects a shift position of the own vehicle. The vehicle state sensor 14 outputs a detection result to the in-vehicle LAN. Alternatively, the detection result from the vehicle state sensor 14 may be output to the in-vehicle LAN through an ECU mounted on the own vehicle.

The vehicle control ECU 15 is an electronic control unit that performs vehicle control such as acceleration and deceleration control and steering control of the own vehicle. The vehicle control ECU 15 may include a steering ECU, a power unit ECU, a brake ECU, and the like. The steering ECU performs steering control of the own vehicle. The power unit ECU controls driving sources such as an internal combustion engine or a motor generator. The brake ECU controls a brake mechanism of the own vehicle.

The driving assist ECU 10 is connected to the periphery monitoring sensor 11, the presentation device 12, and the operation device 13. The driving assist ECU 10 includes a processor, a memory, an I/O, and a bus that connects those devices. The driving assist ECU 10 executes a program stored in a memory for performing corresponding function. The memory referred to here is a non-transitory tangible storage medium, and stores programs and data that can be read by a computer. The non-transitory tangible storage medium may be provided by a semiconductor memory, a magnetic disk, or the like. In the present embodiment, the driving assist ECU 10 executes various types of processes related to parking assist of the own vehicle. This driving assist ECU 10 corresponds to a parking assist apparatus of the present disclosure. Details of the driving assist ECU 10 will be described below.

(Schematic Configuration of Driving Assist ECU 10)

Figure 2:
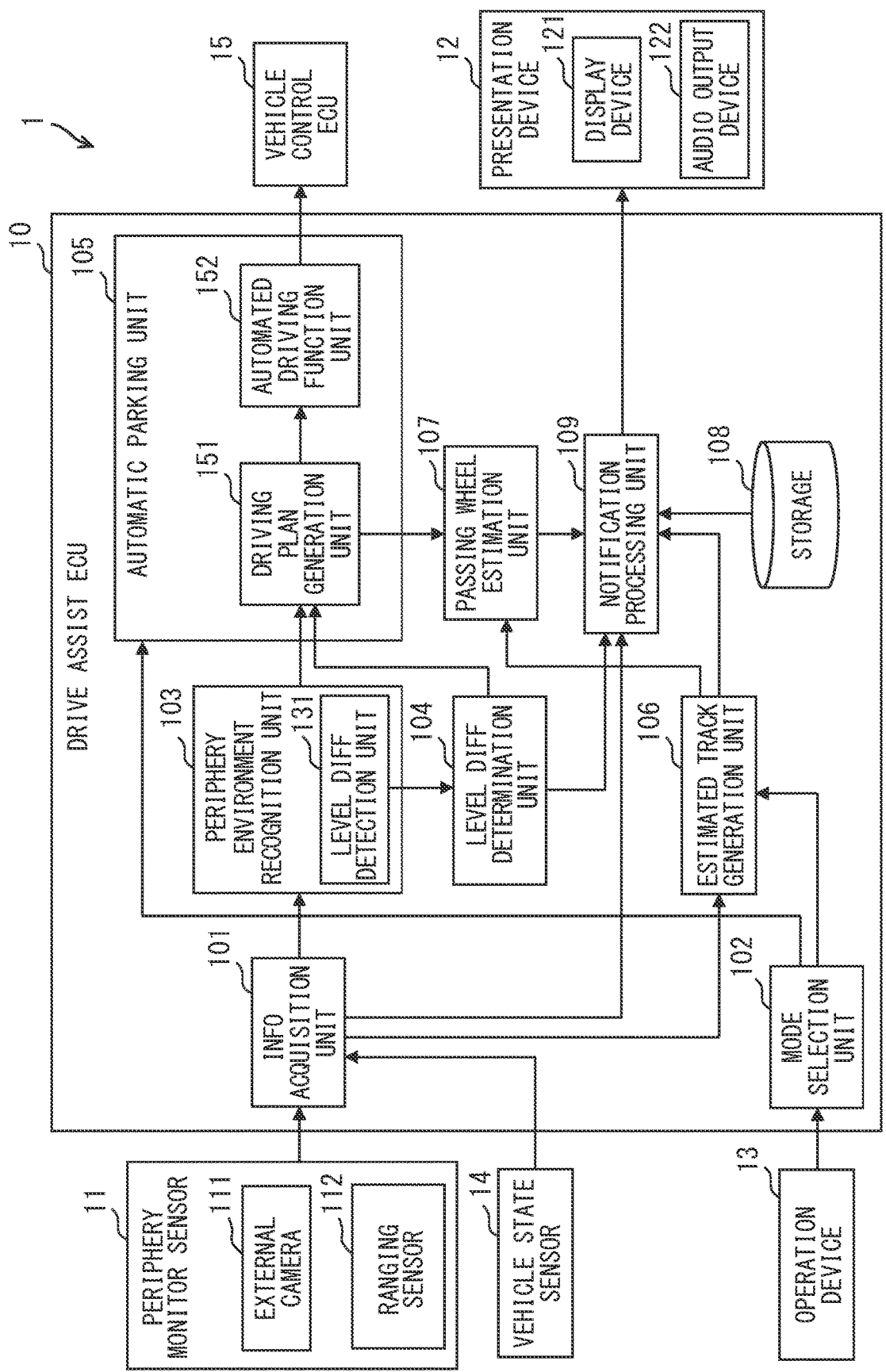
FIG. 2 is a diagram showing an example of a schematic configuration of a driving assist ECU.

The following will describe a schematic configuration of the driving assist ECU 10 with reference to FIG. 2. As shown in FIG. 2, the driving assist ECU 10 includes, as functional blocks, an information acquisition unit 101, a mode selection unit 102, a periphery environment recognition unit 103, a level difference determination unit 104, an automatic parking unit 105, an estimated track generation unit 106, a passing wheel estimation unit 107, a storage 108, and a notification processing unit 109. a part of or entire functional blocks executed by the driving assist ECU 10 may be configured as hardware circuit using one or more integrated chips or the like. Alternatively, a part of or entire functional blocks executed by the driving assist ECU 10 may be implemented as a combination of software and hardware. In software configuration, the functions are executed by at least one processor.

The information acquisition unit 101 acquires sensing results successively obtained by the periphery monitoring sensor 11. The information acquisition unit 101 acquires images successively captured by the external camera 111, and acquires detection results successively detected by the ranging sensor 112. The information acquisition unit 101 acquires detection results successively detected by the vehicle state sensor 14.

The mode selection unit 102 switches the parking assist mode according to the operation made by the user on the operation device 13. As an example, the parking assistance mode may be selected from the above-described three modes including the automatic parking, the manual parking assist, and no parking assist.

The periphery environment recognition unit 103 recognizes obstacles and parking area lines around the vehicle based on sensing results successively sensed by the periphery monitoring sensor 11. The periphery environment recognition unit 103 may detect obstacles and parking area lines from the image captured by the external camera 111 by performing image recognition processing, such as edge detection and pattern matching. The periphery environment recognition unit 103 detects the obstacles and the parking area lines based on an installation position of the external camera 111 relative to the own vehicle, a direction of optical axis of the external camera 111, and positions of objects included in the image captured by the external camera 111. Herein, the external camera 111 is the camera that captures images of the obstacles and the parking area lines. The periphery environment recognition unit 103 may detect an obstacle by determining whether the reflected wave, which is generated when the probe wave is reflected on an object, is received based on the detection result of the ranging sensor 112. The periphery environment recognition unit 103 may detect a positional direction of the obstacle relative to the own vehicle based on a direction in which the probe wave of the ranging sensor 112 is transmitted. The periphery environment recognition unit 103 may detect a distance from the own vehicle to the obstacle based on a time elapsed from when the probe wave is transmitted until when the reflected wave is received. The position of the obstacle relative to the own vehicle may be recognized with above-described method.

The position of the obstacle relative to the subject vehicle may be represented as coordinates in a XY coordinate system with the reference point of the own vehicle as the original point. In this XY coordinate system, an X-axis and a Y-axis are set on a horizontal plane parallel to a road surface.

The periphery environment recognition unit 103 recognizes the parking area based on a recognition result of obstacles and parking area lines existing around the own vehicle. As an example, when obstacles and parking area lines are detected using the external camera 111, a space sandwiched between or in contact with the obstacles or a space sandwiched between the parking lines may be recognized as the parking area. When the obstacles are detected by the ranging sensor 112, by specifying an outline shape of the obstacles from time-series data of the reflection points of the obstacle, a space sandwiched by or in contact with the obstacles may be recognized as the parking area.

The periphery environment recognition unit 103 also includes a level difference detection unit 131. The level difference detection unit 131 detects a level difference existing around the vehicle. The process executed by the level difference detection unit 131 corresponds to a level difference detection process. For example, the level difference detection unit 131 may detect the level difference existing on a road surface by generating a three dimensional virtual space of a periphery environment of the own vehicle based on a group ranging points acquired by the ranging sensor 112. Detection of the level difference includes detection of a height of the level difference with respect to the road surface. For example, when an obstacle has a height that exceeds a vertical sensing range of the ranging sensor 112, an upper limit height that can be recognized based on the sensing result of the ranging sensor 112 may be set as the height of the level difference of the obstacle. The level difference referred here is not limited to an obstacle existing on the road surface or a protrusion on the road surface, but also includes a concave portion on the road surface.

Except using of the sensing result of the ranging sensor 112, the level difference detection unit 131 may detect the level difference with a different method under a condition that the level difference can be detected. For example, the level difference may be detected by image recognition, such as performing pattern matching to the image captured by the external camera 111.

The level difference determination unit 104 determines whether the level difference detected by the level difference detection unit 131 is a passing target level difference to be passed without avoidance or an avoidance target level difference required to be avoided. The process executed by the level difference determination unit 104 corresponds to a level difference determination process. The level difference determination unit 104 may determine whether the level difference is the passing target level difference or the avoidance target level difference based on the height of the level difference detected by the level difference detection unit 131. For example, when the height of the level difference is equal to or less than a predetermined threshold, the level difference determination unit determines the level difference is the passing target level difference. When the height of the level difference is greater than the predetermined threshold, the level difference determination unit determines the level difference is the avoidance target level difference. The threshold referred to here is a value for distinguishing whether the vehicle can safely ride over the level difference. The value of threshold may be properly set in advance. The passing target level difference may include a lock plate installed in a parking lot, a level difference in a sidewalk, and the like. The avoidance target level difference may include a wall, a pole, other vehicles, wheel chocks installed in a parking lot, and the like.

The automatic parking unit 105 executes a process when the automatic parking is selected by the mode selection unit 102. The automatic parking unit 105 includes a driving plan generation unit 151 and an automated driving function unit 152.

The driving plan generation unit 151 determines a target parking position of the own vehicle in the parking area recognized by the periphery environment recognition unit 103. The target parking position may be determined so that the vehicle can be properly positioned within the parking area recognized by the periphery environment recognition unit 103. For example, the driving plan generation unit 151 may determine the target parking position such that the vehicle is positioned in a center portion of the parking area, or the vehicle is positioned such that a broader space can be secured on the driver's seat side. The driving plan generation unit 151 may determine, as a driving plan, a target track by calculating the target track which the vehicle should travel along so that the vehicle can be parked at the target parking position. As an example, the target track may be determined as follows. Here, a case where the own vehicle is parked by moving the vehicle in rear direction will be described as an example. The target track may be a target track of each wheel of the own vehicle, or a target track of each of the left and right outermost portion of the vehicle body of the own vehicle.

For the own vehicle, a turning radius of a rear half route from a steering wheel rotation position where the rotation of steering wheel is performed to the target parking position is determined as a rear half turning radius. The rear half turning radius is determined as a maximum turning radius with which the vehicle is able to enter the target parking position under a condition that the vehicle can keep a distance equal to or greater than a predetermined value from the avoidance target level difference determined by the level difference determination unit 104. The avoidance target level difference is determined among the obstacles detected by the periphery environment recognition unit 103. The rear half turning radius may also be determined as a minimum turning radius of the own vehicle which can keep a distance equal to or greater than a predetermined value from the closest obstacle. The predetermined value referred to here is a distance that is not extremely close to the obstacle, and the predetermined value may be properly set. Then, a turning radius of a front half route from the present position of the own vehicle to the steering wheel rotation position of the own vehicle is determined as a front half turning radius. In the present embodiment, the front half turning radius is a radius of a circle that passes through the current position of the vehicle and is in contact with the rear half route generated with the second half turning radius as a turning radius. A point where the front half route and the rear half route meet is the steering wheel rotation position.

The automatic driving function unit 152 controls the vehicle control ECU 15 to automatically accelerate, brake, and/or steer the own vehicle according to the driving plan generated by the driving plan generation unit 151, thereby automatically parking the vehicle. When a distance between the own vehicle and a position of the obstacle determined as the avoidance target level difference is less than a predetermined threshold, that is, a proximity level is equal to or higher than a predetermined threshold, the driving plan generation unit 151 may correct the determined target track by parallel moving of the target track away from the position of obstacle. When this correction makes that the vehicle fails to reach the target parking position, the automated driving function unit 152 controls the vehicle to perform turning back of the steering wheel such that the moving direction of vehicle is switched and then move the vehicle toward the target parking position. That is, when it becomes impossible to avoid the avoidance target level difference, the automated driving function unit 152 controls the own vehicle to perform turning back of the steering wheel. After the turning back of the steering wheel, the driving plan generation unit 151 may regenerate the target track of the vehicle.

The automatic parking unit 105 is not limited to a configuration in which acceleration/deceleration and steering operation are controlled for parking the vehicle in the parking area along the target track as the automatic parking. For example, only the steering operation may be controlled automatically for performing the automatic parking.

The estimated track generation unit 106 executes a process when the mode selection unit 102 selects the manual parking assist. The estimated track generation unit 106 generates an estimated track of the vehicle using the steering angle of the vehicle and the like acquired by the information acquisition unit 101 from the vehicle state sensor 14. An example of calculating the estimated track will be described. In the following description, as an example, the estimated track is generated according to the steering angle of the own vehicle.

For example, the estimated track may be generated according to the steering angle 8 based on the turning radius R obtained from a relationship expression $R=L/\tan \theta$. In this case, the turning center O may be on an extension line of an axle of the own vehicle. The steering angle is indicated by $\theta$, a wheel base of the own vehicle is indicated by L. The estimated track may be generated by arranging a track arc of the outermost periphery of the vehicle, which is calculated based on the steering angle and the vehicle speed, so as to pass through each of the left rear corner portion and the right rear corner portion of the own vehicle. The estimated track may also be generated by arranging the track arc so as to pass through each of the left rear wheel and right rear wheel of the own vehicle.

The passing wheel estimation unit 107 estimates the wheel of own vehicle which passes through the passing target level difference determined by the level difference determination unit 104 based on a planned route of the own vehicle. When the automatic parking is selected by the mode selection unit 102, the target track generated by the driving plan generation unit 151 is set as the planned route of the own vehicle. When the manual parking assist is selected by the mode selection unit 102, the estimated track generated by the estimated track generation unit 106 is set as the planned route of the own vehicle.

The passing wheel estimation unit 107 identifies the track of each wheel of the own vehicle based on the planned route of the own vehicle. When the planned route of the own vehicle is the track of the wheel of the own vehicle, the track of the wheel may be used for identifying the passing wheel. When the planned route of the vehicle is the track of a vehicle portion other than the wheel, the track of each wheel of the own vehicle may be specified based on the vehicle's planned route with consideration of a positional deviation between each wheel and the vehicle portion other than the wheel. For example, when the planned route of the own vehicle is set to be the same for the front wheels and the rear wheels of the own vehicle, the tracks of the wheels may be configured such that the tracks of the front wheels are not distinguished from the tracks of the rear wheels. Then, the passing wheel estimating unit 107 may estimate the wheel, which has a track intersecting with the passing target level difference in the above-described XY coordinate system, as a wheel that passes the passing target level difference.

The storage 108 stores information, such as vehicle CG (Computer Graphics), icons, and texts used for generating images to be displayed on the display device 121.

The notification processing unit 109 controls the presentation device 12 to output a notification (hereinafter referred to as level difference passing plan notification) indicating a passing plan of the passing target level difference when the passing target level difference determined by the level difference determination unit 104 exists on the traveling route to be traveled by the vehicle within the parking area for parking purpose. The process executed by the notification processing unit 109 corresponds to a notification process. The existence of level difference on the traveling route corresponds to a case where the level difference exists on the planned route of the own vehicle. The level difference passing plan notification may be performed in display mode or audio mode. In the following description, the notification is performed by a display on the display device 121 as an example.

Figure 3:
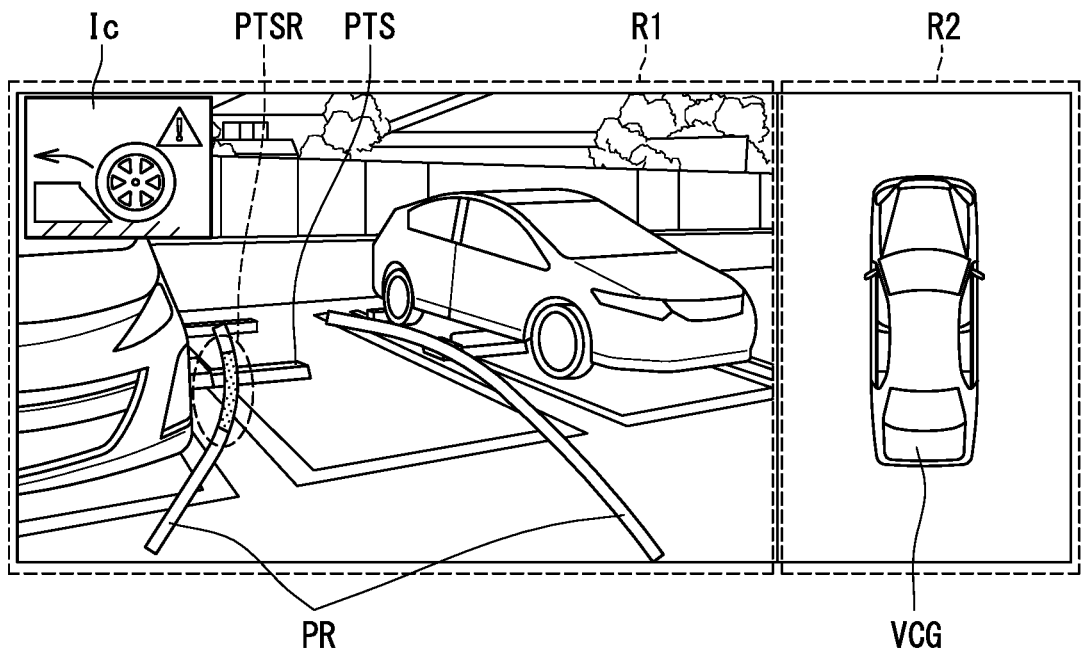
FIG. 3 is a diagram for explaining an example of an image displayed on a screen of a display device during parking assistance.

The following will describe a diagram for explaining an example of an image displayed on a screen of the display device 121 during parking assist with reference to FIG. 3. As shown in FIG. 3, the screen of the display device 121 is divided into two regions R1, R2. A traveling direction image is displayed in the region R1. An overhead view image is displayed in the region R2. Although the details are omitted for the sake of simplification of explanation, image processing, such as distortion correction may be performed to the images displayed on the screen of the display device 121 during parking assist. The notification processing unit 109 may generate the traveling direction image and the overhead view image based on the images captured by the external camera 111 and the information stored in the storage 108.

The travel direction image is an image captured by the external camera 111 that captures images in the traveling direction of the vehicle. FIG. 3 shows an example in which the traveling direction of the own vehicle is the rear direction. The notification processing unit 109 displays, in superimposed manner, the planned route PR of the own vehicle (see PR in FIG. 3). When the automatic parking is selected by the mode selection unit 102, the planned route may be set as the target track generated by the driving plan generation unit 151. When the manual parking assist is selected by the mode selection unit 102, the planned route may be set as the estimated track generated by the estimated track generation unit 106.

The overhead view image is an image obtained by performing a viewpoint conversion on the images captured by the external camera 111 in four directions including the front direction, the rear direction, the left direction, and the right direction of the vehicle. The viewpoint conversion is performed such that the overhead view image is viewed from a virtual view point positioned directly above the own vehicle. In the present embodiment, the notification processing unit 109 combines each of the converted overhead view images viewed from the virtual view point directly above the own vehicle. The overhead view images are converted from the images captured by the front camera, the right side camera, the left side camera, and the rear camera. Thus, the notification processing unit 109 displays the overhead view image indicating entire periphery of the own vehicle. For the image of the own vehicle that is not captured by the external camera 111 in the overhead view image, the vehicle CG (see VCG in FIG. 3) may be synthesized in the overhead view image. The vehicle CG corresponds to a vehicle image.

Figure 4:
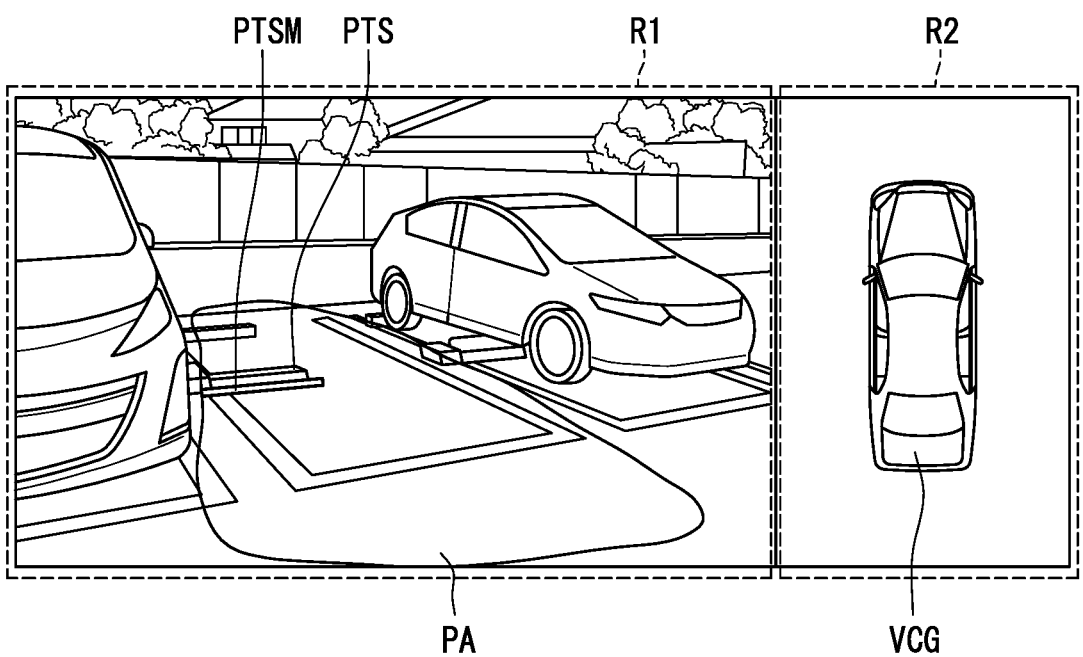
FIG. 4 is a diagram for explaining an example of an image displayed on a screen of a display device during parking assistance.

As shown in FIG. 3, the notification processing unit 109 displays an icon (see Ic in FIG. 3) indicating that the own vehicle is planned to pass over the passing target level difference (see PTS in FIG. 3) as the level difference passing plan notification. With this configuration, when the own vehicle is planned to pass over the level difference during the parking, it is possible to notify the passing of level difference to the occupant of the own vehicle in advance. Although the example of FIG. 4 shows an example in which the icon is displayed in the traveling direction image in superimposed manner, the present disclosure is not limited to this configuration. For example, the icon may be displayed in the overhead view image in superimposed manner, or may be displayed on a display region different from the traveling direction image or the overhead view image. The display of icon may be performed by an indicator or the like.

As the level difference passing plan notification, as shown in FIG. 3, the notification processing unit 109 may display, on a line indicating the planned route of the own vehicle displayed in the traveling direction image, a level difference area corresponding to a position of the passing target level difference (see PTSR in FIG. 3) in a different display mode from the remaining area other than the level difference area. For example, the level difference area may be distinguished by different colors or presence or absence of blinking display. According to this configuration, the occupant of the own vehicle can recognize the detailed position of the level difference that the own vehicle is going to pass during the parking of own vehicle. Thus, the occupant can prepare for the shock caused by passing of the level difference.

The level difference passing plan notification may be displayed in different mode. The following will describe a diagram for explaining another example of the image displayed on the screen of the display device 121 during parking assist with reference to FIG. 4. Similar to FIG. 3, the screen of the display device 121 is divided into two regions R1, R2 as shown in FIG. 4.

As shown in FIG. 4, the notification processing unit 109 may not display an icon indicating that the vehicle is going to pass the passing target level difference. As the level difference passing plan notification, the notification processing unit 109 displays, in superimposed manner, a linear mark (see PTSM in FIG. 4) indicating the passing target level difference at a position close to the vehicle from an existing position of the passing target level difference (see PTS in FIG. 4) in the traveling direction image. According to this configuration, the occupant of the own vehicle can recognize the detailed position of the level difference that the own vehicle is going to pass during the parking of own vehicle. Thus, the occupant can prepare for the shock caused by passing of the level difference.

The mark indicating the passing target level difference is not limited to the linear shape, and may have a different shape such as a wall shape. The position where the mark indicating the passing target level difference is displayed may be an existing position of the passing target level difference instead of the position close to the vehicle from the existing position of the passing target level difference. For example, as shown in FIG. 4, except a case where the level difference passing plan notification is performed by changing the display mode of level difference area on the line indicating the planned route, the display of planned route may be omitted. As an example, a display indicating the parking area (see PA in FIG. 4) may be performed instead.

Figure 5:
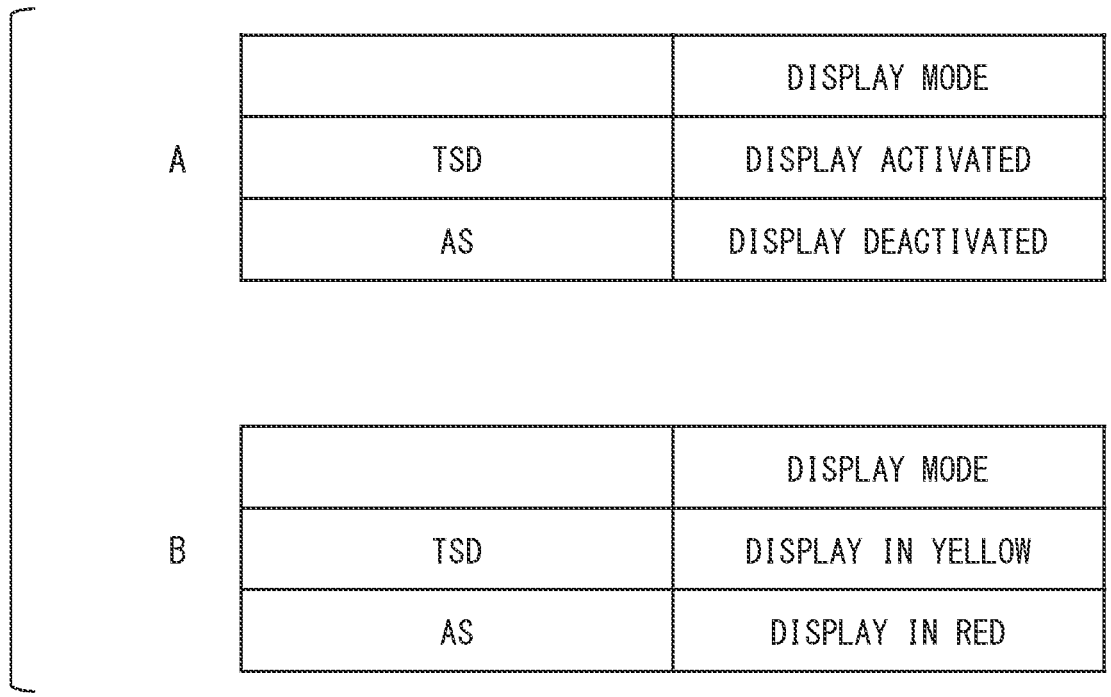
FIG. 5 is a diagram for explaining an example of a notification mode in which a passing target level difference is notified in distinguishable manner from an avoidance target level difference.

The notification processing unit 109 may perform the level difference passing plan notification by notifying the passing target level difference and the avoidance target level difference in distinguishable different modes. For example, the notification processing unit may be configured to not output a notification for the avoidance target level difference and output a notification for the passing target level difference. As an example, as shown in A of FIG. 5, the notification processing unit may be configured to activate a display of the passing target level difference and deactivate a display of the avoidance target level difference. According to this configuration, the occupant of the own vehicle can distinguish and recognize the passing target level difference from the avoidance target level difference. In FIG. 5, the passing target level difference is indicated by TSD, and the avoidance target level difference is indicated by AS. Deactivating the display of the avoidance target level difference does not mean the avoidance target level difference itself is not displayed in the captured image. Deactivating the display of the avoidance target level difference means deactivating display of a mark indicating the avoidance target level difference in the captured image.

As another example, as shown in B of FIG. 5, the notification processing unit controls the display device to display both of the passing target level difference and the avoidance target level difference, and controls the display device to output the notification indicating the passing plan of the passing target level difference in a notification mode that distinguishes the passing target level difference from the avoidance target level difference. For example, the passing target level difference and the avoidance target level difference may be displayed in different colors. In the example shown in B of FIG. 5, the passing target level difference is displayed in yellow, and the avoidance target level difference is displayed in red. According to this configuration, both of the passing target level difference and the avoidance target level difference are displayed, and the occupant of the own vehicle can be notified of that the system of own vehicle recognizes, in distinguishable manner, the passing target level difference from the avoidance target level difference.

As an example, when the vehicle cannot move unless avoiding the avoidance target level difference by performing turning back of the steering wheel during automatic parking, the notification processing unit 109 may display the avoidance target level difference at the position where the turning back of the steering wheel is required to be carried out. The notification processing unit 109 may display the passing target level difference in distinguishable display mode from the avoidance target level difference. With this configuration, the occupant of the own vehicle can recognize the intention of the own vehicle to perform the turning back of steering wheel during automatic parking, and the occupant's reliability on the own vehicle system can be improved.

When the vehicle can move while avoiding the avoidance target level difference during automatic parking, the target track for avoiding the avoidance target level difference is generated. Thus, the display indicating the avoidance target level difference is not performed. For the passing target level difference, the target track is generated so that the target track passes the passing target level difference. Thus, the display indicating the passing target level difference, which intersects with the target track, is performed.

Figure 6:
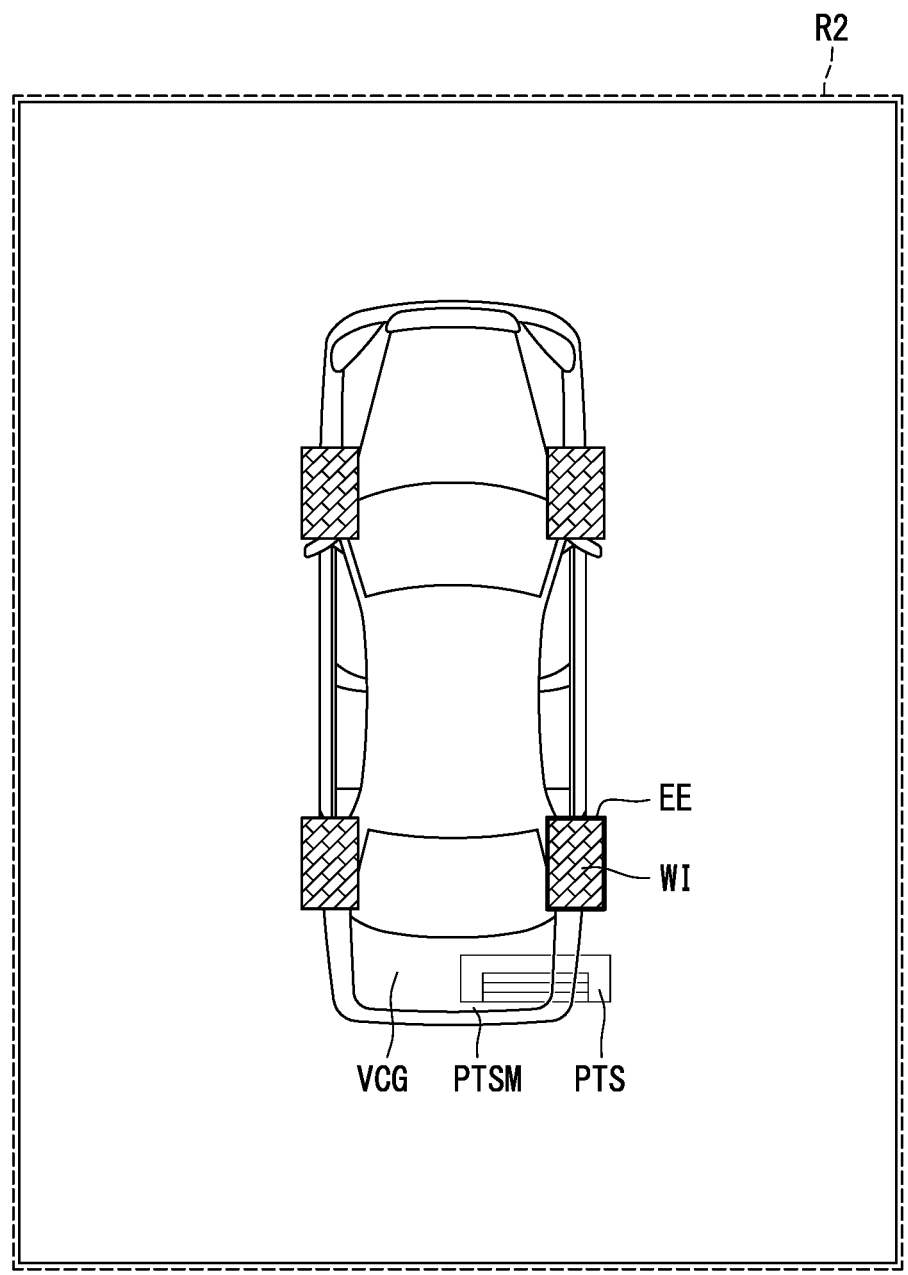
FIG. 6 is a diagram showing an example of a notification notifying passing plan of a level difference using an overhead view image.

The notification processing unit 109 may display a history image in which the bottom portion of the vehicle CG is shown in translucent manner in the overhead view image. The history image may be generated based on past images captured before the current time. The history image corresponds to a past captured image which shows an area positioned below the vehicle CG before the present time. The past images may be made available by storing multiple past images captured by multiple times in the storage 108. When the vehicle moves and the passing target level difference is located below the vehicle, as shown in FIG. 6, the notification processing unit 109 performs, as the level difference passing plan notification, a display indicating the passing target level difference (refer to PTSM in FIG. 6) in translucent manner under the vehicle CG (refer to VCG in FIG. 6) in the overhead view image. The display of the passing target level difference performed as the level difference passing plan notification is shown at a location of the passing target level difference (see PTS in FIG. 6). With this configuration, the occupant of the own vehicle can be notified of the positional relationship between the own vehicle and the passing target level difference even when the passing target level difference is located below the vehicle. For convenience, FIG. 6 shows a display example of the region R2 described above.

When the passing target level difference is displayed by displaying the bottom portion of the vehicle CG in translucent manner in the overhead view image, the notification processing unit 109 may display a wheel image (see WI in FIG. 6) at a location of the wheel of the own vehicle on the vehicle CG. The wheel image is an image of a wheel, and may be provided by an illustration image of a wheel. According to the above configuration, in addition to the display of the passing target level difference, the wheel image is displayed at the position of the vehicle of the own vehicle. Thus, the display can enable the occupant of the own vehicle to grasp a passing time of the passing target level difference in advance. As a result, the occupant of the own vehicle can be more prepare for the shock caused by the passing of passing target level difference.

As the level difference passing plan notification, as shown in FIG. 6, the notification processing unit 109 displays, among the wheels of the own vehicle CG shown in overhead view image, the wheel which is determined by the passing wheel estimation unit 107 to pass the passing target level difference in different mode from the wheel which is determined by the passing wheel estimation unit 107 to not pass the passing target level difference. Thus, the wheel passing the passing target level difference can be distinguished from the wheel which does not pass the passing target level difference. For example, the wheel image may be surrounded by a highlighted frame or the like (see EE in FIG. 6). As another example, highlighted display, such as blinking effect may be performed to the wheel. This configuration can enable the occupant of the own vehicle to recognize the wheel that plans to pass the passing target level difference in an easy manner. As a result, the occupant of the own vehicle can be more prepare for the shock caused by the passing of passing target level difference.

When a distance between the wheel and the passing target level difference becomes equal to or less than a predetermined distance, the highlighted display of the wheel which is determined by the passing wheel estimation unit 107 to pass the passing target level difference may be started.

(Process Related to Level Difference Passing Plan Notification Executed in Driving Assist ECU 10)

Figure 7:
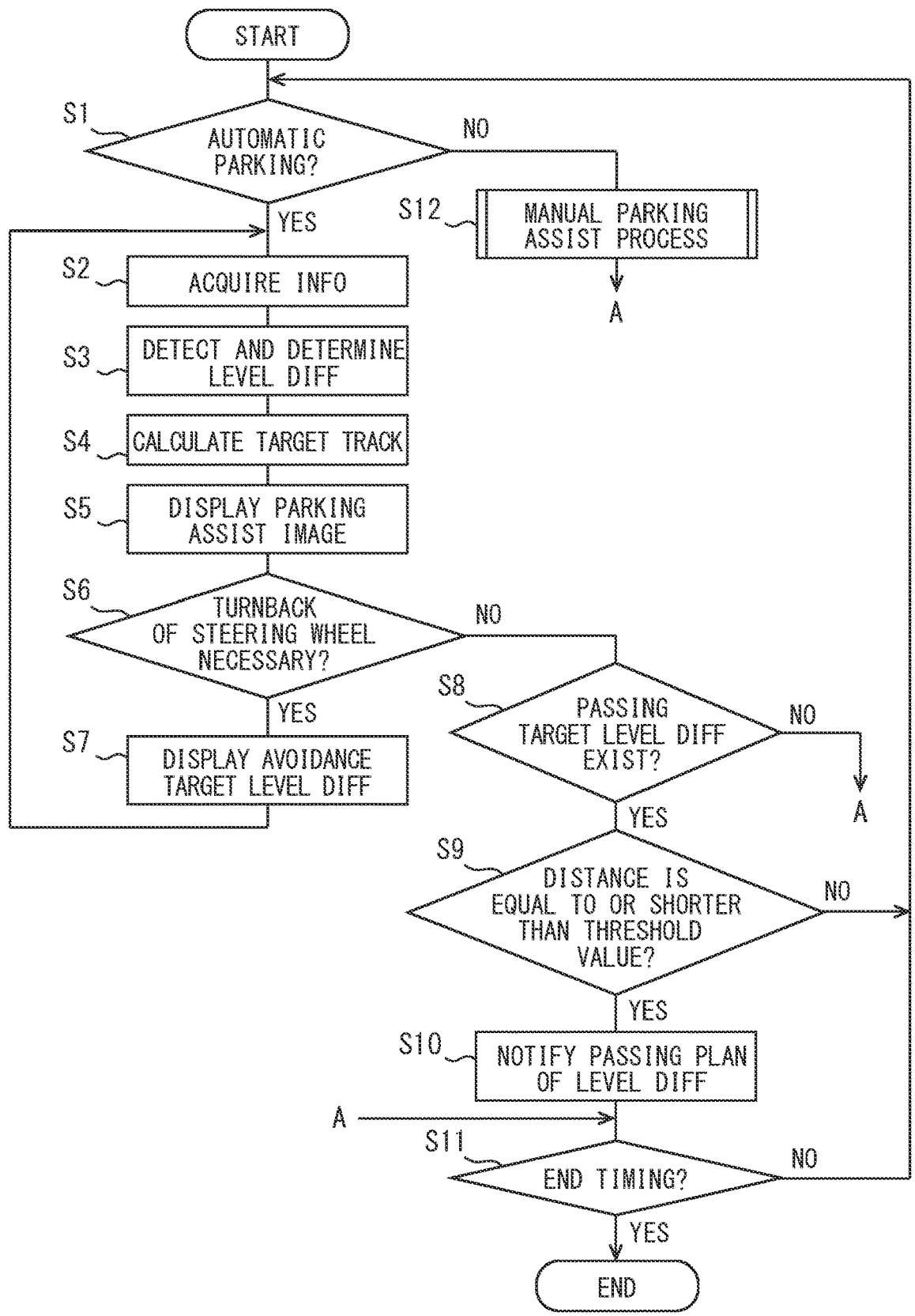
FIG. 7 is a flowchart showing an example of a level difference passing notification process to be executed by the driving assist ECU.

The following will describe a process related to level difference passing plan notification (hereinafter referred to as level difference passing plan notification related process) executed in the driving assist ECU 10 with reference to the flowchart shown in FIG. 7. The flowchart shown in FIG. 7 may start when a predetermined condition is satisfied. The process shown in FIG. 7 may start in response to a switch for starting an internal combustion engine or a motor generator of the own vehicle being turned on. The switch for starting the vehicle is also referred to as a power switch. Another condition may be a selection of the automatic parking mode or the manual parking assist mode by the mode selection unit 102. Further another condition may be an input of a signal indicating that the shift position is switched to the reverse position, an input of a signal indicating an operation of parking assist switch, or the like.

In S1, when the automatic parking mode is selected by the mode selection unit 102 (YES in S1), the process proceeds to S2. When the manual parking assist is selected by the mode selection unit 102 (NO in S1), the process proceeds to S12.

In S2, the information acquisition unit 101 acquires sensing results successively obtained by the periphery monitoring sensor 11 and detection results successively detected by the vehicle state sensor 14. In S3, the level difference detection unit 131 detects a level difference existing around the vehicle. In S3, when the level difference is detected, the level difference determination unit 104 determines whether the detected level difference is the passing target level difference or the avoidance target level difference.

In S4, the driving plan generation unit 151 calculates a target track along which the vehicle should travel so that the vehicle can be parked at the target parking position. In S5, the notification processing unit 109 controls the screen of the display device 121 to display a parking assist image. As an example, the traveling direction image and the overhead view image generated based on the images captured by the external cameras 111 and the information stored in the storage 108 are displayed. As described above, the images captured by the external cameras 111 and the information stored in the storage are acquired in S1.

In S6, when the vehicle cannot avoid the avoidance target level difference without turning back of the steering wheel (YES in S6), the process proceeds to S7. That is, when turning back of the steering wheel is necessary, the process proceeds to S7. When the vehicle is possible to move by avoiding the avoidance target level difference without turning back of the steering wheel (NO in S6), the process proceeds to S8.

In S7, when the vehicle reaches a position (hereinafter referred to as a turning back position) where the turning back of the steering wheel is required to avoid the avoidance target level difference, the display indicating avoidance target level difference is performed at the position of the avoidance target level difference in the traveling direction image or at a position in front of the position of the avoidance target level difference close to the different. The display indicating the avoidance target level difference is a display that clearly indicates the avoidance target level difference.

In S8, when one of the level differences determined in S3 intersects with the target track of the own vehicle (YES in S8), the process proceeds to S9. When all of the level differences determined in S3 do not intersect with the target track of the own vehicle (NO in S8), the process proceeds to S11.

In S9, when the distance between the passing target level difference intersecting with the target track of the own vehicle and the predetermined position of the vehicle is equal to or shorter than a threshold value (YES in S9), the process proceeds to S10. When the distance between the passing target level difference intersecting with the target track of the own vehicle and the predetermined position of the vehicle is longer than the threshold value (NO in S9), the process returns to 51 and executes the following steps again. The predetermined position referred to here may be an end portion of the body of the own vehicle on the traveling direction side of the own vehicle. The threshold value may be set to a proper value. In S10, the notification processing unit 109 controls executions of the level difference passing plan notification. For example, when the automatic parking mode is selected by the mode selection unit 102, the above-described various types of display may be performed as examples of the level difference passing plan notification.

In S11, when the current time is an end time of the level difference passing plan notification related process (YES in S11), the level difference passing plan notification related process is terminated. For example, end of the automatic parking at the target parking position, turning off of the power switch or the like may be set as the end time of the level difference passing plan notification related process. The end of the automatic parking at the target parking position may be determined when the shift position of the vehicle is switched to the parking position at the target parking position. In S11, when the current time is not the end time of the level difference passing plan notification related process (YES in S11), the process returns to S1 and executes the following steps again.

Figure 8:
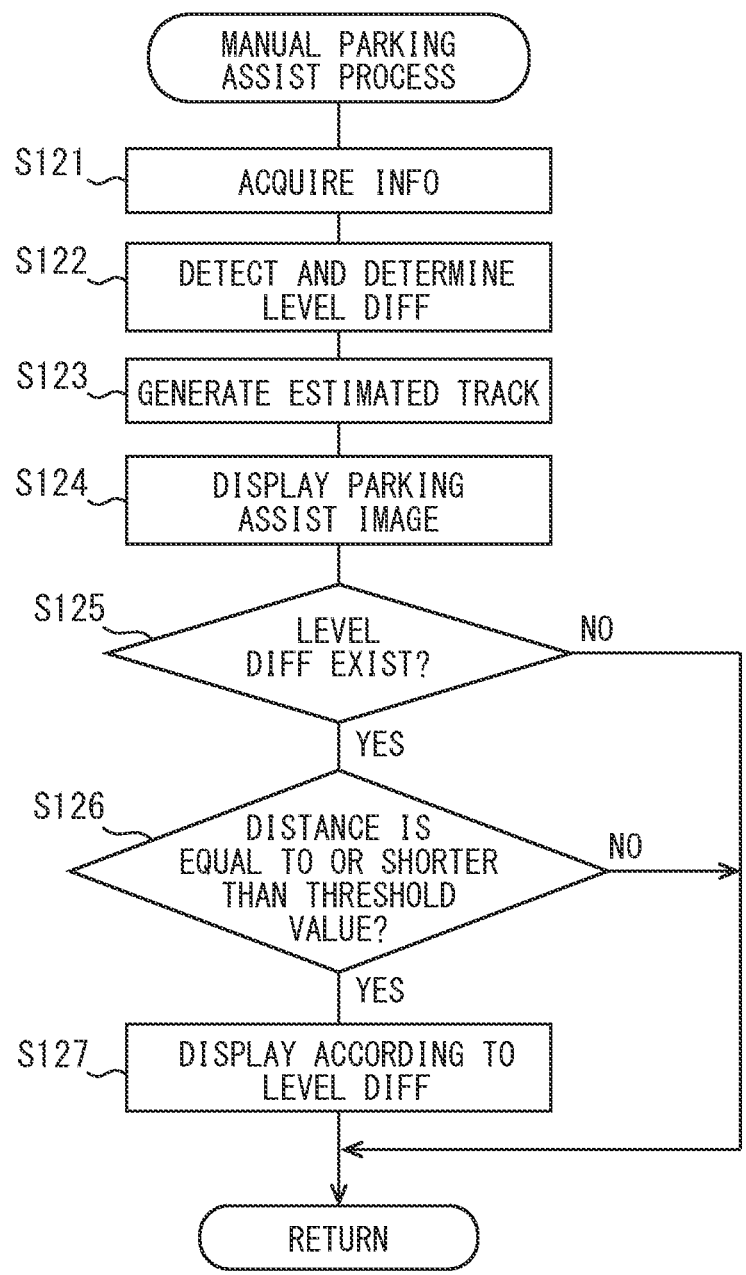
FIG. 8 is a flowchart showing an example of a manual parking assist process to be executed by the driving assist ECU.

In S12, a manual parking assist process is performed, and then the process proceeds to S11. The following will describe an example of the manual parking assist process with reference to the flowchart shown in FIG. 8.

The process in S121 and S122 are the same as the process in S2 and S3. In S123, the estimated track generation unit 106 generates an estimated track of the vehicle corresponding to the steering angle of the own vehicle. In S124, the notification processing unit 109 controls the screen of the display device 121 to display the parking assist image. As an example, the traveling direction image and the overhead view image generated based on the images captured by the external cameras 111 and the information stored in the storage 108 are displayed. As described above, the images captured by the external cameras 111 and the information stored in the storage are acquired in 51. In S124, the notification processing unit 109 may display the estimated track generated in S123 in superimposed manner on the traveling direction image.

In S125, when one of the level differences detected in S122 intersects with the estimated track of the own vehicle (YES in S125), the process proceeds to S126. When all of the level differences detected in S122 do not intersect with the estimated track of the own vehicle (NO in S125), the process proceeds to S11.

In S126, when the distance between the level difference intersecting with the estimated track of the own vehicle and the predetermined position of the vehicle is equal to or shorter than a threshold value (YES in S126), the process proceeds to S127. When the distance between the level difference intersecting with the estimated track of the own vehicle and the predetermined position of the vehicle is longer than the threshold value (NO in S126), the process returns to S1 and executes the following steps again.

In S127, the notification processing unit 109 performs a display of the level difference (hereinafter referred to as a notification target level difference), which is determined in S126 that the distance between the level difference and the predetermined position of the own vehicle is equal to or shorter than the threshold value, corresponding to whether the level difference is the passing target level difference or the avoidance target level difference. Then, the process proceeds to S11. In response to the notification target level difference being determined as the passing target level difference in S122, the above-described various types of display may be performed as examples of the level difference passing plan notification when the automatic parking mode is selected by the mode selection unit 102. In response to the notification target level difference being determined as the avoidance target level difference in S122, the avoidance target level difference may be displayed at the existing position of the avoidance target level difference or at a position in front of the existing position of the avoidance target level difference close to the own vehicle. In the traveling direction image, on the line indicating the estimated track of own vehicle, an area corresponding to the existing position of the avoidance target level difference may be displayed in different mode from an area corresponding to the existing position of the passing target level difference. In this case, the display mode of the area corresponding to the existing position of the avoidance target level difference may be differed in distinguishable manner from the display mode of the area corresponding to the passing target level difference. For example, the passing target level difference and the avoidance target level difference may be displayed in different colors.

With this configuration, when the own vehicle is planned to pass over the level difference during the parking, it is possible to notify the passing of level difference to the occupant of the own vehicle in advance by performing the level difference passing plan notification to the occupant.

Second Embodiment

In the first embodiment, the level difference passing plan notification is performed in addition to the display of the icon indicating that the vehicle plans to pass the passing target level difference. The present disclosure is not limited to this configuration. Alternatively, as the level difference passing plan notification, only the icon indicating that the vehicle plans to pass the passing target level difference may be displayed. In another example, as the level difference passing plan notification, only an audio signal may be output without performing any display.

Third Embodiment

In the first embodiment, the mode selection unit 102 can switch the parking assist mode between the automatic parking and the manual parking assist mode. The present disclosure is not necessarily limited to this configuration. For example, only the automatic parking mode or only the manual parking assist mode may be provided in the own vehicle.

Fourth Embodiment

In the above-described embodiment, the overhead view image is obtained by converting a viewpoint to a virtual view point positioned directly above the own vehicle, and the overhead view image is used to perform the level difference passing plan notification. The present disclosure is not limited to this configuration. For example, an image (hereinafter referred to as a 3D View) obtained by converting the viewpoint to a virtual view point positioned above the own vehicle and viewing the vehicle in angled view line may be generated, and this 3D view may be used instead of the overhead view image. In this configuration, the 3D view may be obtained by performing a viewpoint conversion on the images captured by the external camera 111 in four directions including the front direction, the rear direction, the left direction, and the right direction of the vehicle. The viewpoint conversion is performed such that the 3D view is viewed from a virtual view point positioned diagonally above the own vehicle. The 3D View is generated by synthesizing images captured in four directions and projecting them onto, for example, a three-dimensional curved surface in a substantially hemispherical shape concave downward. With this configuration, it is possible to display an image in which obstacles around the vehicle are shown in three-dimensional manner.

Note that the present disclosure is not limited to the embodiments described above and can variously be modified within the scope of the disclosure. An embodiment obtained by appropriately combining the technical features disclosed in the different embodiments is also included in the technical scope of the present disclosure. The control unit and the method thereof described in the present disclosure may be implemented by a special purpose computer which includes a processor programmed to execute one or more functions executed by a computer program. Alternatively, the control unit and the method thereof described in the present disclosure may be implemented by a special purpose hardware logic circuit. Alternatively, the control unit and the method thereof described in the present disclosure may be implemented by one or more special purpose computers configured by a combination of a processor executing a computer program and one or more hardware logic circuits. The computer programs may be stored, as instructions to be executed by a computer, in a tangible non-transitory computer-readable storage medium.

What is claimed is:

1. A A parking assist apparatus assisting a parking of a vehicle, the parking assist apparatus comprising:
    a processor;
    a non-transitory computer-readable storage medium; and
    a set of computer-executable instructions stored on the non-transitory computer-readable storage medium that cause the processor to:
    detect a level difference existing around the vehicle;
    determine whether the level difference is a passing target level difference or an avoidance target level difference, the passing target level difference being a level difference that is to be passed over without avoidance, and the avoidance target level difference being a level difference that is to be avoided; and
    control a notification apparatus to output a notification inside of a compartment of the vehicle, the notification indicating a plan to pass over the level difference in response to determining that the level difference existing on a traveling route to be traveled by the vehicle within a parking area for parking purpose is the passing target level difference,
    wherein
    the notification indicates indicating the plan to pass over the level difference in a notification mode that distinguishes the passing target level difference from the avoidance target level difference,
    the vehicle is capable of automatic parking within the parking area where the vehicle is to be parked by automated driving, and the vehicle is controlled to perform to pass over the level difference or avoid the avoidance target level difference while performing automatic parking, and
    in a case where a turning back of a steering wheel of the vehicle is required while performing automatic parking to avoid the avoidance target level difference, the notification apparatus is controlled to (i) display the avoidance target level difference at a position where the turning back of the steering wheel is required and (ii) display the passing target level difference in a different mode that is distinguishable from the avoidance target level difference.

2. The parking assist apparatus according to claim 1, wherein
the notification apparatus comprises a display device and outputs to output the notification as a display toward the inside of the compartment of the vehicle, and
the display device is controlled to display both of the passing target level difference and the avoidance target level difference while performing the notification indicating the plan to pass over the level difference in the notification mode that distinguishes the passing target level difference from the avoidance target level difference.

3. The parking assist apparatus according to claim 1, wherein the notification apparatus comprises a display device and outputs the notification as a display toward the inside of the compartment of the vehicle, and
the display device is controlled to display at least an icon indicating the plan to pass over the level difference as the notification indicating the plan to pass over the level difference.

4. The parking assist apparatus according to claim 1, wherein
the notification apparatus comprises a display device and outputs the notification as a display toward the inside of the compartment of the vehicle, and
as the notification indicating the plan to pass over the level difference, the display device is controlled to display, in a captured image showing at least a periphery of the vehicle, the passing target level difference (i) at an existing position of the passing target level difference or (ii) at a position close to the vehicle from the existing position of the passing target level difference.

5. The parking assist apparatus according to claim 1, wherein
the notification apparatus comprises a display device to output the notification as a display toward the inside of the compartment of the vehicle, and
as the notification indicating the plan to pass over the level difference, the display device is controlled to display, on a line indicating a planned route of the vehicle included in a captured image showing at least a periphery of the vehicle, a portion corresponding to an existing position of the passing target level difference in a different mode from a remaining portion of the line indicating the planned route of the vehicle.

6. The parking assist apparatus according to claim 1, wherein
the notification apparatus comprises a display device to output the notification as a display toward the inside of the compartment of the vehicle, in a case where the passing target level difference is positioned under the vehicle as the vehicle moves, as the notification indicating the plan to pass over the level difference, the display device is controlled to display the passing target level difference at an existing position of the passing target level difference together with a vehicle image, and the vehicle image is generated such that the vehicle is viewed from a virtual view point located overhead of the vehicle and displayed in a translucent manner.

7. The parking assist apparatus according to claim 1, wherein the set of computer-executable instructions further cause the processor to:

estimate a passing wheel of the vehicle, which passes the passing target level difference, based on a planned route of the vehicle, wherein the notification apparatus comprises a display device to output the notification as a display toward the inside of the compartment of the vehicle, and as the notification indicating the plan to pass over the level difference, the display device is controlled to (i) display vehicle wheel images, which are included in a vehicle image viewed from a virtual view point located overhead of the vehicle and (ii) display the passing wheel estimated to pass the passing target level difference in a distinguishable different mode from remaining wheels of the vehicle estimated to not pass the passing target level difference.

8. A parking assist method assisting a parking of a vehicle and being executed by at least one processor, the parking assist method comprising:

detecting a level difference existing around the vehicle;

determine whether the level difference is a passing target level difference or an avoidance target level difference, the passing target level difference being a level difference that is to be passed over without avoidance, and the avoidance target level difference being a level difference that is to be avoided; and controlling a notification apparatus to output a notification inside of a compartment of the vehicle, the notification indicating a plan to pass over the level difference in response to the detected level difference, which exists on a traveling route to be traveled by the vehicle within a parking area for parking purpose, being determined as the passing target level difference, wherein the notification indicates the plan to pass over the level difference in a notification mode that distinguishes the passing target level difference from the avoidance target level difference, the vehicle is capable of automatic parking within the parking area where the vehicle is to be parked by automated driving, and the vehicle is controlled to perform to pass over the level difference or avoid the avoidance target level difference while performing automatic parking, and in a case where a turning back of a steering wheel of the vehicle is required while performing automatic parking to avoid the avoidance target level difference, the notification apparatus is controlled to (i) display the avoidance target level difference at a position where the turning back of the steering wheel is required and (ii) display the passing target level difference in a different mode that is distinguishable from the avoidance target level difference.

9. A parking assist system assisting a parking of a vehicle, the parking assist system comprising:

a notification apparatus configured to output a notification inside of a compartment of the vehicle;

a processor;

a non-transitory computer-readable storage medium; and a set of computer-executable instructions stored on the non-transitory computer-readable storage medium that cause the processor to:

detect a level difference existing around the vehicle;

determine whether the level difference is a passing target level difference or an avoidance target level difference, the passing target level difference being a level difference that is to be passed over without avoidance, and the avoidance target level difference being a level difference that is to be avoided; and control the notification apparatus to output the notification inside of the compartment of the vehicle, the notification indicating a plan to pass over the level difference in response to determining that the level difference existing on a traveling route to be traveled by the vehicle within a parking area for parking purpose is the passing target level difference, wherein the notification indicates the plan to pass over the level difference in a notification mode that distinguishes the passing target level difference from the avoidance target level difference, the vehicle is capable of automatic parking within the parking area where the vehicle is to be parked by automated driving, and the vehicle is controlled to perform to pass over the level difference or avoid the avoidance target level difference while performing automatic parking, and in a case where a turning back of a steering wheel of the vehicle is required while performing automatic parking to avoid the avoidance target level difference, the notification apparatus is controlled to (i) display the avoidance target level difference at a position where the turning back of the steering wheel is required and (ii) display the passing target level difference in a different mode that is distinguishable from the avoidance target level difference.

10. The parking assist apparatus according to claim 1, wherein the turning back of the steering wheel comprises switching the moving direction of vehicle and moving the vehicle toward the target parking position.

11. A parking assist apparatus assisting a parking of a vehicle, the parking assist apparatus comprising:

a processor;

a non-transitory computer-readable storage medium; and a set of computer-executable instructions stored on the non-transitory computer-readable storage medium that cause the processor to:

detect a level difference existing around the vehicle;

determine whether the level difference is a passing target level difference or an avoidance target level difference, the passing target level difference being a level difference that is to be passed over without avoidance, and the avoidance target level difference being a level difference that is to be avoided; and control a notification apparatus to output a notification inside of a compartment of the vehicle, the notification indicating a plan to pass over the level difference in response to determining that the level difference existing on a traveling route to be traveled by the vehicle within a parking area for parking purpose is the passing target level difference, wherein
the notification indicates the plan to pass over the level difference in a notification mode that distinguishes the passing target level difference from the avoidance target level difference,
the vehicle is capable of automatic parking within the parking area where the vehicle is to be parked by automated driving, and the vehicle is controlled to perform to pass over the level difference or avoid the avoidance target level difference while performing automatic parking,
wherein
the notification apparatus comprises a display device to output the notification as a display toward the inside of the compartment of the vehicle, and
as the notification indicating the plan to pass over the level difference, the display device is controlled to display, on a line indicating a planned route of the vehicle included in a captured image showing at least a periphery of the vehicle, a portion corresponding to an existing position of the passing target level difference in a different mode from a remaining portion of the line indicating the planned route of the vehicle.

12. A parking assist apparatus assisting a parking of a vehicle, the parking assist apparatus comprising:
a processor;
a non-transitory computer-readable storage medium; and
a set of computer-executable instructions stored on the non-transitory computer-readable storage medium that cause the processor to:
detect a level difference existing around the vehicle;
determine whether the level difference is a passing target level difference or an avoidance target level difference, the passing target level difference being a level difference that is to be passed over without avoidance, and the avoidance target level difference being a level difference that is to be avoided; and
control a notification apparatus to output a notification inside of a compartment of the vehicle, the notification indicating a plan to pass over the level difference in response to determining that the level difference existing on a traveling route to be traveled by the vehicle within a parking area for parking purpose is the passing target level difference,
wherein
the notification indicates the plan to pass over the level difference in a notification mode that distinguishes the passing target level difference from the avoidance target level difference,
the vehicle is capable of automatic parking within the parking area where the vehicle is to be parked by automated driving, and the vehicle is controlled to perform to pass over the level difference or avoid the avoidance target level difference while performing automatic parking,
wherein
the set of computer-executable instructions further cause the processor to:
estimate a passing wheel of the vehicle, which passes the passing target level difference, based on a planned route of the vehicle, wherein
the notification apparatus comprises a display device to output the notification as a display toward the inside of the compartment of the vehicle, and
as the notification indicating the plan to pass over the level difference, the display device is controlled to (i) display vehicle wheel images, which are included in a vehicle image viewed from a virtual view point located overhead of the vehicle and (ii) display the passing wheel estimated to pass the passing target level difference in a distinguishable different mode from remaining wheels of the vehicle estimated to not pass the passing target level difference.

\* \* \* \* \*